United States Patent
Hasegawa et al.

(10) Patent No.: US 11,467,592 B2
(45) Date of Patent: Oct. 11, 2022

(54) ROUTE DETERMINATION METHOD

(71) Applicant: Honda Motor Co., Ltd., Tokyo (JP)

(72) Inventors: Yuji Hasegawa, Saitama (JP); Sango Matsuzaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 266 days.

(21) Appl. No.: 16/809,577

(22) Filed: Mar. 5, 2020

(65) Prior Publication Data
US 2020/0293051 A1 Sep. 17, 2020

(30) Foreign Application Priority Data

Mar. 11, 2019 (JP) ............................ JP2019-043577

(51) Int. Cl.
| | |
|---|---|
| G05D 1/02 | (2020.01) |
| G01C 21/36 | (2006.01) |
| G06K 9/62 | (2022.01) |
| G06V 20/10 | (2022.01) |

(52) U.S. Cl.
CPC ....... *G05D 1/0221* (2013.01); *G01C 21/3647* (2013.01); *G05D 1/0231* (2013.01); *G06K 9/6262* (2013.01); *G06V 20/10* (2022.01)

(58) Field of Classification Search
CPC .... G05D 1/0221; G05D 1/0231; G06V 20/10; G06K 9/6262; G06N 3/08; G06T 7/20; G06T 7/11; G06T 7/70; G06T 7/90; B25J 13/089; B25J 9/0081; B25J 5/007; B25J 9/163; B25J 9/1666
See application file for complete search history.

(56) References Cited

U.S. PATENT DOCUMENTS

2019/0202055 A1* 7/2019 Wang ................... B25J 9/1671

FOREIGN PATENT DOCUMENTS

| JP | 2004120661 A | * | 4/2004 | ............ B60Q 9/005 |
| JP | 2009020897 A | * | 1/2009 | |
| JP | 2009110495 | | 5/2009 | |

(Continued)

OTHER PUBLICATIONS

Translation of JP2009020897A to Matsumoto et al. (Year: 2008).*
(Continued)

*Primary Examiner* — Kenneth J Malkowski
*Assistant Examiner* — Carville Albert Hollingsworth, IV
(74) *Attorney, Agent, or Firm* — JCIPRNET

(57) ABSTRACT

A method for determining a route of a robot is provided such that a moving apparatus can move smoothly to a destination point while avoiding interference with a plurality of moving objects such as traffic participants. In an environment in which a plurality of second pedestrians moves along predetermined movement patterns, a plurality of movement routes when a first pedestrian moves toward a destination point is recognized. Data, in which a compound environmental image constituted of time series of environmental images indicating a visual environment around a virtual robot when the virtual robot moves along each of the plurality of movement routes and a moving direction command indicating a moving direction of the virtual robot are combined, is generated as learning data. Model parameters of a CNN (action model) is learned using the learning data, and a moving velocity command for a robot is determined using a learned CNN.

10 Claims, 10 Drawing Sheets

(56) References Cited

FOREIGN PATENT DOCUMENTS

| | | | | |
|---|---|---|---|---|
| JP | 2010191502 | | 9/2010 | |
| JP | 2016172469 A | * | 9/2016 | ............ B60K 37/02 |
| JP | 2018044848 A | * | 3/2018 | |
| KR | 101401311 B1 | * | 5/2014 | |

OTHER PUBLICATIONS

Translation of JP2018044848A to Kunihito et al. (Year: 2016).*
Translation of KR101401311B1 to Lim et al. (Year: 2014).*
Translation of JP2016172469A to Takemori et al. (Year: 2016).*
Translation of JP2004120661A to Kakinami et al. (Year: 2004).*

* cited by examiner

ROUTE DETERMINATION METHOD

CROSS-REFERENCE TO RELATED APPLICATION

This application claims the priority benefits of Japan Patent Application No. 2019-043577, filed on Mar. 11, 2019. The entirety of the above-mentioned patent application is hereby incorporated by reference herein and made a part of this specification.

BACKGROUND

Technical Field

The disclosure relates to a route determination method for an autonomous mobile type robot.

Description of Related Art

In the related art, route determination methods for an autonomous mobile type robot disclosed in Patent Document 1 (Japanese Patent Laid-Open No. 2009-110495) and Patent Document 2 (Japanese Patent Laid-Open No. 2010-191502) are known. In the route determination method of Patent Document 1, predicted interference likelihood times at which a robot is likely to interfere with traffic participants such as pedestrians are calculated based on the velocities of the traffic participants. Moreover, presumed virtual obstacle regions to which traffic participants will move after a predetermined time are calculated. Further, a route of the robot is determined based on the interference likelihood times and the virtual obstacle regions. Accordingly, interference between the robot and traffic participants is avoided.

In addition, in the route determination method of Patent Document 2, a current position of a robot is calculated, an obstacle map is generated based on distance data from measurement by an external sensor, and map information is read from a storage unit. Subsequently, with reference to the obstacle map and the map information, whether or not an obstacle is present on a route stored in the map information is judged. When an obstacle is present on the route, the route of the robot is executed using an A* search algorithm. Specifically, based on current position information, the obstacle map, and the map information, the probability of the presence of an obstacle in a number of grid squares surrounding the robot on a grid map is calculated, and grid squares having the lowest probability of the presence of an obstacle are determined for a route.

According to the route determination method in the foregoing Patent Document 1, since interference likelihood times of traffic participants and virtual obstacle regions are used, when real traffic participants such as pedestrians move along unpredictable trajectories, an interference state occurs frequently between a robot and the traffic participants. As a result, a halt state of the robot occurs frequently, and low productivity is caused. Particularly, the issue becomes noticeable in a traffic environment with the presence of a crowd of people.

In addition, also in the case of the route determination method in Patent Document 2, when real traffic participants such as pedestrians move along unpredictable trajectories, the same issue as that in Patent Document 1 occurs. Particularly, in a traffic environment with the presence of a crowd of people, due to a state where grid squares having the lowest probability of the presence of an obstacle cannot be found, a halt time of a robot is lengthened.

SUMMARY

According to an aspect of the disclosure, there is provided a route determination method including recognizing a plurality of movement routes of a first moving object when the first moving object moves to the destination point while avoiding interference with each of a plurality of second moving objects in a condition in which the plurality of second moving objects moves along a plurality of respective movement patterns different from each other; generating a plurality of pieces of learning data in which environmental image data including a compound environmental image generated by compounding a time series of environmental images indicating an environment of the moving apparatus and action parameters indicating actions of the moving apparatus are associated with each other, when the moving apparatus moves along each of the plurality of movement routes; generating a learned model that is the learned action model in which the environmental image data is input whereas the action parameters are output by learning model parameters of the action model in accordance with a designation learning method using the plurality of pieces of learning data; and determining the target movement route of the moving apparatus using the learned model.

DESCRIPTION OF THE EMBODIMENT

Figure 1:
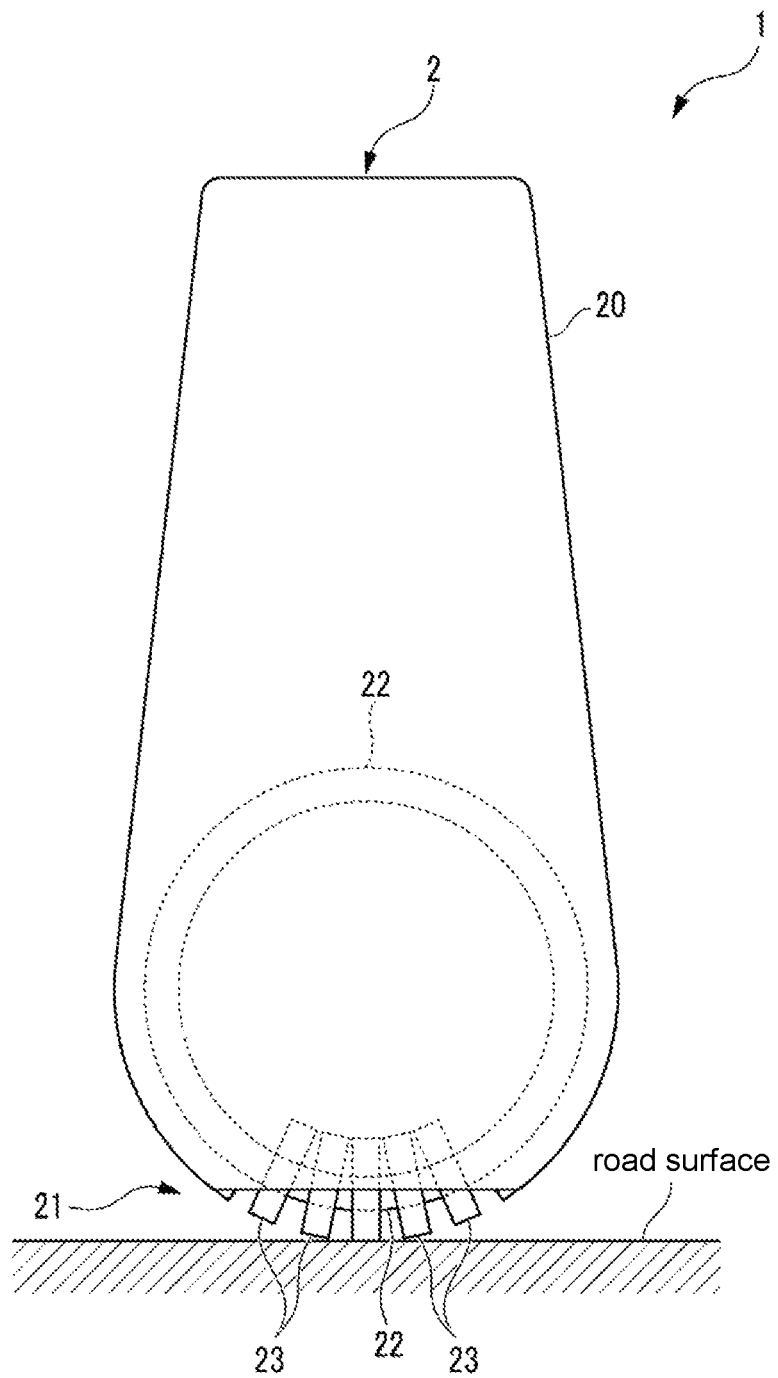
FIG. 1 is a view of an appearance of a robot in which a route determination system according to an embodiment of the disclosure is applied.

The disclosure provides a method for determining a route of a robot such that a moving apparatus can move smoothly to a destination point while avoiding interference with a plurality of moving objects such as traffic participants.

The disclosure relates to a method for determining a target movement route of a moving apparatus to a destination point in a condition in which a plurality of moving objects is present around the moving apparatus.

According to the route determination method of the disclosure, in an environment in which the plurality of second moving objects moves along the plurality of respective movement patterns, the plurality of movement routes when the first moving object moves toward the destination point while avoiding interference with the plurality of second moving objects is recognized. Moreover, data, in which the compound environmental image constituted of a time series of environmental images indicating a visual environment around a virtual moving apparatus and a moving direction command indicating a moving direction of the virtual moving apparatus when the virtual moving apparatus moves along each of the plurality of movement routes in a virtual space are combined, is generated as learning data. The learned model is generated by learning the model parameters of the action model in which the environmental image data including the compound environmental image is input whereas the moving direction command is output, using the learning data. Further, a moving velocity command for the moving apparatus is determined using the learned model.

Therefore, model parameters of a learning model can be learned accurately while an actual movement route of the first moving object and relative movement behaviors of the second moving objects with respect to the first moving object are reflected. As a result, even in a condition in which a plurality of moving objects is present around the moving apparatus, the target movement route of the moving apparatus can be determined such that the moving apparatus moves smoothly to the destination point while avoiding interference with the plurality of moving objects.

According to an embodiment of the disclosure, in the route determination method, images including a plurality of moving object image regions indicating a plurality of respective moving objects present around the moving apparatus are recognized as the environmental images. The compound environmental image, in which the plurality of moving object image regions included in a plurality of the respective environmental images is superposed, is generated.

According to the route determination method, in the compound environmental image, the plurality of moving object image regions respectively indicating a plurality of moving objects present around the moving apparatus is included, and a time series of the moving object image regions is superposed. Accordingly, since learning data including the environmental image data in which time-series movement behaviors of the moving objects are simply indicated can be generated, the structure of the action model is simplified. Further, the computation processing quantity at the time of determining a route of a robot is reduced. As a result, the route of the robot can be determined promptly and accurately.

According to an embodiment of the disclosure, in the route determination method, the compound environmental image, in which the plurality of moving object image regions is superposed, is generated such that a hue, a chroma, a brightness, or an arbitrary combination thereof in a portion or all of each of the plurality of moving object image regions is distinguished in accordance with a sequential order of the time series of the plurality of environmental images respectively.

According to the route determination method, it is possible to generate learning data including the environmental image data in which time-series movement behaviors of moving objects are simply indicated such that they are distinguished from each other based on at least one attribute of three attributes of color in accordance with the order of the time series. Accordingly, the structure of the action model is simplified. Further, the computation processing quantity at the time of determining a route of a robot is reduced. As a result, the route of the robot can be determined promptly and accurately.

According to an embodiment of the disclosure, in the route determination method, the compound environmental image, in which a subsequent moving object image region of the plurality of moving object image regions in time series is superposed on a preceding moving object image region of the plurality of moving object image regions in time series such that at least a portion thereof is concealed, is generated.

According to the route determination method, it is possible to generate learning data including the environmental image data in which time-series movement behaviors of moving objects are simply indicated such that they are distinguished from each other based on a vertical relationship in superposition in accordance with the order of the time series. Accordingly, the structure of the action model is simplified. Further, the computation processing quantity at the time of determining a route of a robot is reduced. As a result, the route of the robot can be determined promptly and accurately.

According to an embodiment of the disclosure, in the route determination method, the environmental image data further includes at least one of a velocity image indicating fluctuations in velocity of the moving apparatus and a directional image indicating a direction of the destination point, in addition to the compound environmental image.

According to the route determination method, the environmental image data further includes at least one of the velocity image indicating fluctuations in velocity of the moving apparatus and the directional image indicating the direction of the destination point, in addition to the compound environmental image. Therefore, the structure of the action model is simplified. Further, the computation processing quantity at the time of determining a route of a robot is reduced. As a result, the route of the robot can be determined promptly and accurately.

According to an embodiment of the disclosure, in the route determination method, the plurality of pieces of learning data is constituted of the environmental image data and the action parameters associated with the environmental image data, when a virtual image of a robot moves along each of the plurality of movement routes in a virtual space.

According to the route determination method, the plurality of pieces of learning data is generated by moving the virtual moving apparatus along each of the plurality of movement routes in the virtual space. Accordingly, since there is no need to actually prepare a moving apparatus (real machine), it is possible to easily generate not only learning data but also a database which can store and retain the learning data.

Constitution of Route Determination System

A route determination system 1 illustrated in FIG. 1 as an embodiment of the disclosure is applied to an inverted pendulum type robot 2 (corresponding to "a moving apparatus") and determines a route of the robot 2 using a technique (which will be described below) under a condition of high probability of the presence of traffic participants.

Figure 2:
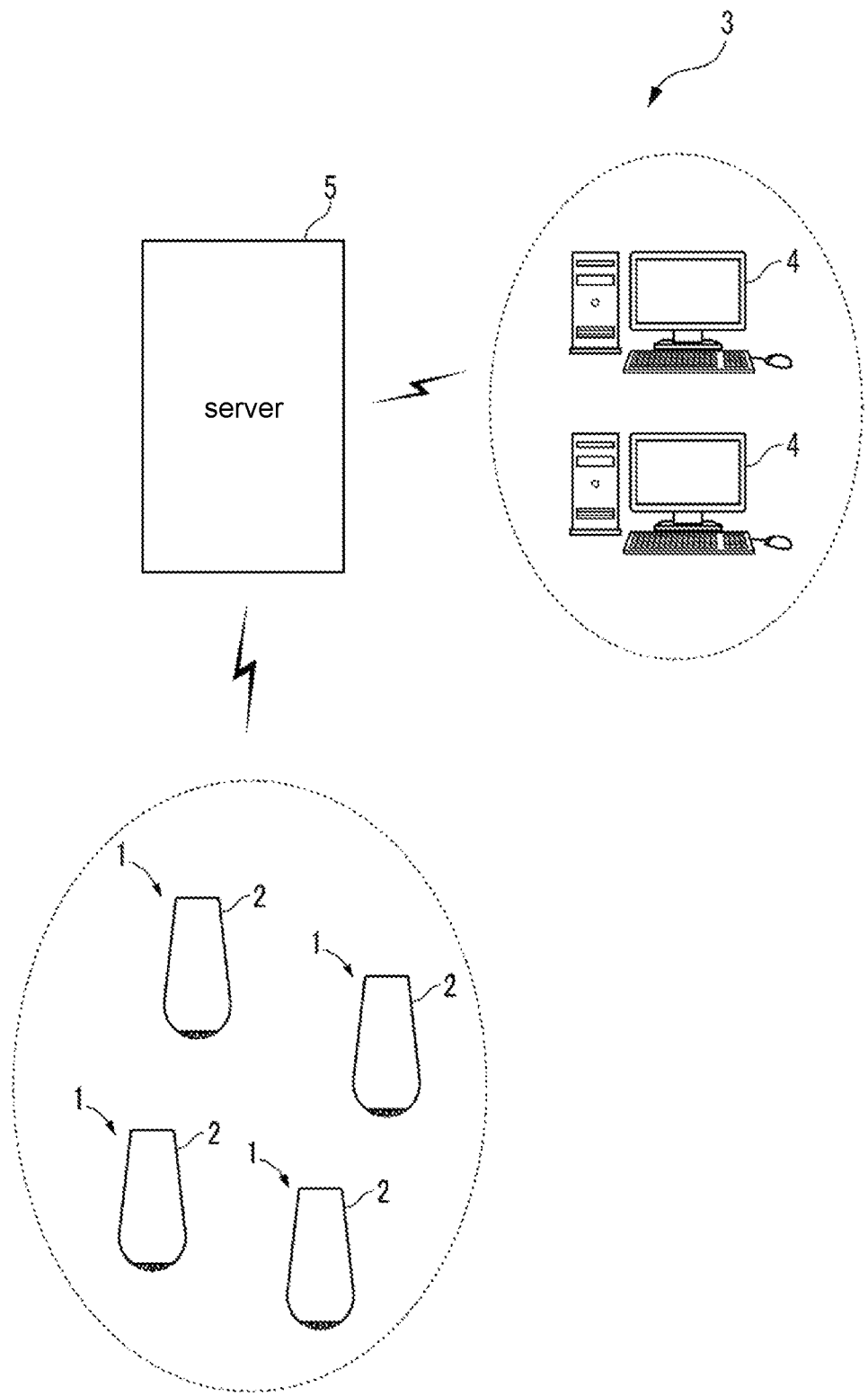
FIG. 2 is a view of a constitution of a guide system for the robots.

The robot 2 is an autonomous mobile type robot and is used in a guide system 3 illustrated in FIG. 2. The guide system 3 is a type in which the robot 2 guides a user by leading the user to his/her destination point (for example, a store or a boarding gate) in shopping malls, airports, and the like.

As illustrated in FIG. 2, the guide system 3 includes a plurality of robots 2 which autonomously moves within a predetermined region, an input device 4 which is provided separately from the plurality of robots 2 and to which a destination point of a user is input, and a server 5 which allows radio communication between the robots 2 and the input device 4.

For example, the input device 4 is constituted of at least one of a mouse, a keyboard, and a touch panel. In response to an input of a destination point performed by a user (or an operator) through the input device 4, destination point data indicating the destination point is transmitted to the server 5. When the destination point data is received via the server 5, based on map data stored in a storage device of the server 5, the destination point indicated based on the destination point data, or an intermediate point between a current point and the destination point is set as a designation point Pobj. Designation point data indicating the designation point Pobj is transmitted from the server 5 to the robot 2.

Constitution of Robot

When the designation point data transmitted from the server 5 is received by a control device 10 of the robot 2 via a radio communication device 14, the designation point Pobj indicated by the designation point data is read, and a route to the designation point Pobj is determined.

Next, a mechanical constitution of the robot 2 will be described. As illustrated in FIG. 1, the robot 2 includes a main body 20, a movement mechanism 21 provided in a lower part of the main body 20, and the like and is constituted to be able to move in all directions on a road surface using the movement mechanism 21.

For example, the movement mechanism 21 has a constitution similar to that of the movement mechanism disclosed in Japanese Patent Laid-Open No. 2017-56763. The movement mechanism 21 includes a toric core body 22, a plurality of rollers 23, a first actuator 24, and a second actuator 25 (refer to FIG. 3). The plurality of rollers 23 is externally fitted to the core body 22 such that they are arranged at equal angle intervals in a circumferential direction (direction around a shaft center) of the core body 22. Each of the plurality of rollers 23 can rotate integrally with the core body 22 around the shaft center of the core body 22. In addition, each of the rollers 23 can rotate around a central axis (axis in a tangential direction of the circumference about the shaft center of the core body 22) in a cross section of the core body 22 at an arrangement position of each of the rollers 23.

Moreover, the first actuator 24 is constituted of an electric motor and rotatably drives the core body 22 around the shaft center thereof via a drive mechanism (not illustrated) when a control input signal (which will be described below) is input from the control device 10.

Similar to the first actuator 24, the second actuator 25 is also constituted of an electric motor and rotatably drives the rollers 23 around the shaft center thereof via a drive mechanism (not illustrated) when a control input signal is input from the control device 10. Accordingly, the main body 20 is driven by the first actuator 24 and the second actuator 25 such that it moves in all directions on a road surface. Due to the foregoing constitution, the robot 2 can move in all directions on a road surface.

Figure 3:
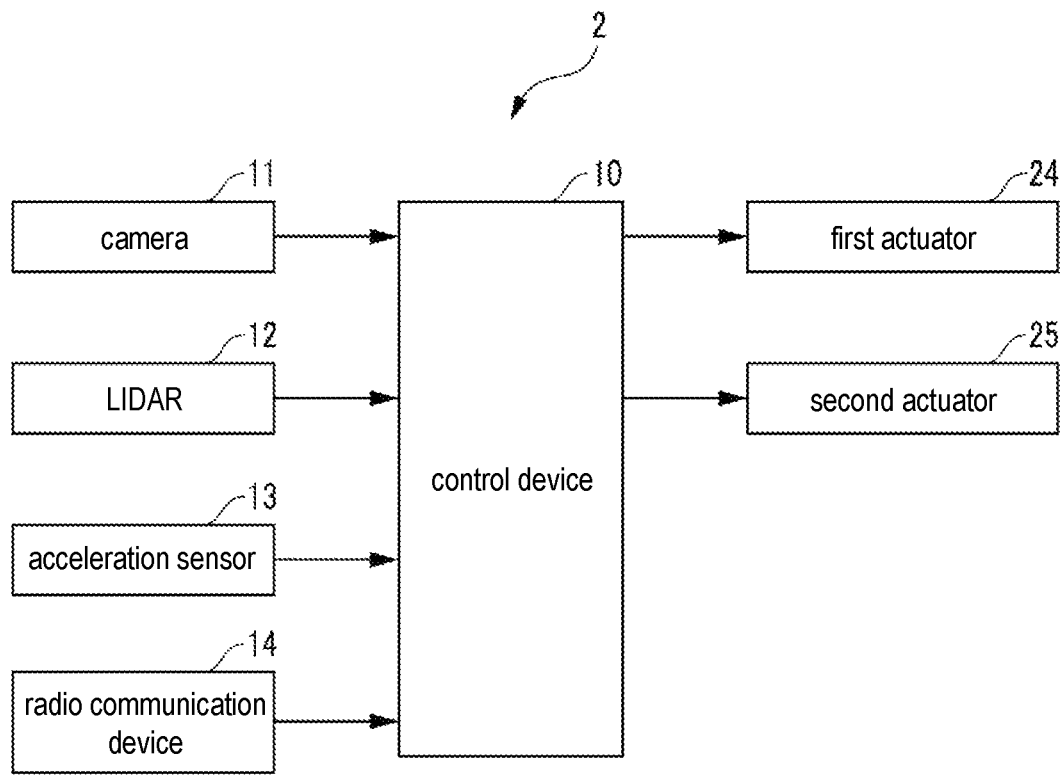
FIG. 3 is a block diagram illustrating an electrical constitution of the robot.

Next, an electrical constitution of the robot 2 will be described. As illustrated in FIG. 3, the robot 2 further includes the control device 10, a camera 11, a LIDAR 12, acceleration sensors 13, and the radio communication device 14.

The control device 10 is constituted of a microcomputer having a computation processing device such as a CPU, a single-core processor, or/and a multi-core processor; a memory (storage device) such as a RAM, a ROM, or/and an E2PROM; an I/O interface, and various kinds of electric circuits. Within the E2PROM, map data of a guiding place of the robot 2 and software for executing computation processing in accordance with a convolutional neural network (CNN) are stored. The CNN is a CNN after model parameters of the CNN, that is, a weight of a bonding layer and a bias term are sufficiently learned by a learning apparatus 30 (which will be described below).

The camera 11 (image capturing device) captures images of environments around the robot 2 and outputs image signals indicating the environments to the control device 10. The LIDAR 12 (range sensor) measures distances or the like to a target within a surrounding environment using laser beams and outputs measurement signals indicating the distances to the control device 10. Moreover, the acceleration sensors 13 detect acceleration degrees of the robot 2 and output detection signals indicating the acceleration degrees to the control device 10.

The control device 10 estimates a self-position of the robot 2 by an adaptive Monte Carlo localization (amcl) technique using the image signals of the camera 11 and the measurement signals of the LIDAR 12 described above. In addition, the control device 10 calculates an x velocity component v_x and a y velocity component v_y of the robot 2 based on the measurement signals of the LIDAR 12 and detection signals of each of the acceleration sensors 13.

Moreover, the radio communication device 14 is connected to the control device 10, and the control device 10 executes radio communication with the server 5 via the radio communication device 14.

Route Determination Method

Figure 4:
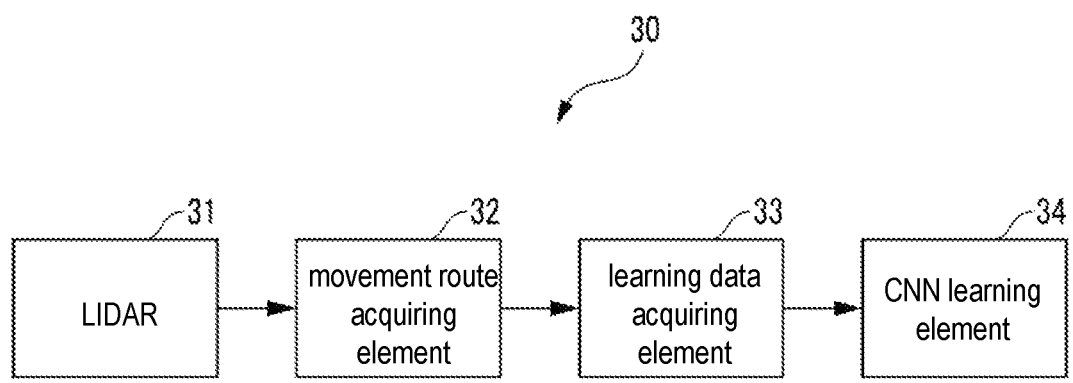
FIG. 4 is a block diagram illustrating a constitution of a learning apparatus.

Next, a constitution of the route determination system 1 of the present embodiment and a principle of the route determination method will be described. The learning apparatus 30 illustrated in FIG. 4 learns the model parameters (weight of the bonding layer and the bias term) (which will be described below) of the CNN and includes a LIDAR 31, a movement route acquiring element 32, a learning data acquiring element 33, and a CNN learning element 34. These elements 32 to 34 are constituted of a computation processing device, a storage device, and the like.

Figure 5:
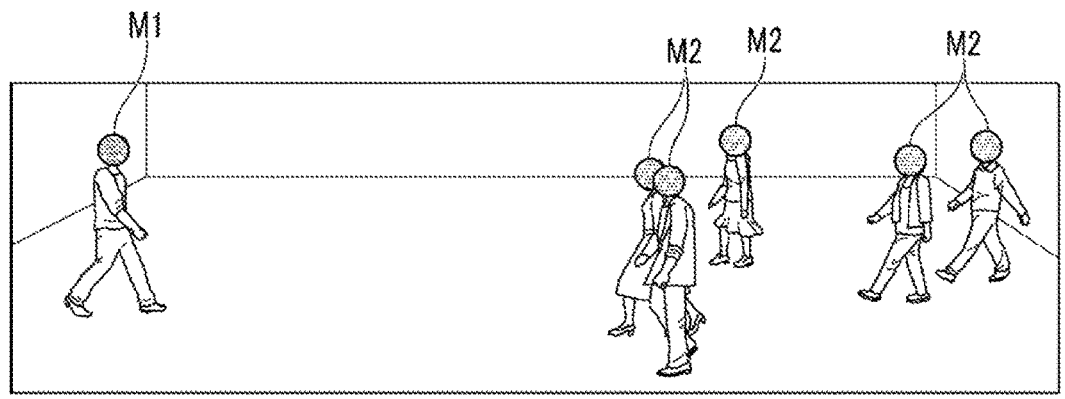
FIG. 5 is a perspective view at the time of acquiring a movement route of a first pedestrian.

First, in order to learn movement routes of ordinary pedestrians, as illustrated in FIG. 5, a condition of a crowd of people, in which in a case where a first pedestrian M1 (corresponding to "a first moving object") as a reference pedestrian moves (or walks) from a movement start point Ps (refer to FIG. 6) to a destination point Po (refer to FIG. 6), a plurality of second pedestrians M2 (corresponding to "second moving objects") are present in a traveling direction of the first pedestrian M1 in an irregular arrangement when the first pedestrian M1 starts to move, is set.

Subsequently, using the LIDAR 31, a time series of actual spatial positions (actual spatial position track) when the first pedestrian M1 actually moves from the movement start point Ps to the destination point Po and a time series of actual spatial positions of the plurality of second pedestrians M2 are measured, and measurement results thereof are output to the movement route acquiring element 32.

Figure 6:
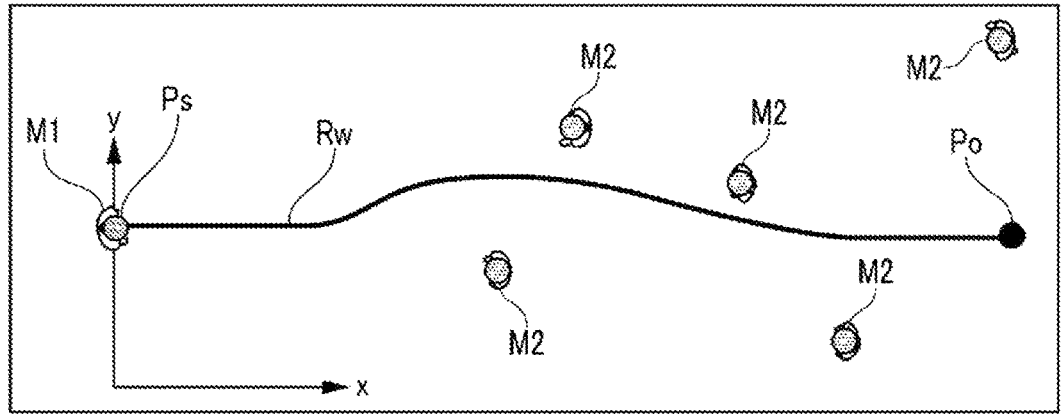
FIG. 6 is a view of an example of an acquisition result of the movement route in FIG. 5.

Further, in the movement route acquiring element 32, based on the measurement results of the time series of the actual spatial positions of each of the first pedestrian M1 and the plurality of second pedestrians M2, for example, a movement route Rw of the first pedestrian M1 from the movement start point Ps to the destination point Po in an actual space as illustrated in FIG. 6 is recognized and is stored in the storage device. As illustrated in FIG. 6, the movement route Rw of the first pedestrian M1 is defined by a plurality of discrete coordinate values (x, y) in a two-dimensional space or a continuous function y=f(x).

For example, coordinate values of the movement start point Ps of the first pedestrian M1 are defined as (0, α) (0<α), and a movement starting direction of the first pedestrian M1 is defined as a positive y direction. The time series of the actual spatial positions or the movement routes of the second pedestrians M2 during a period of time until the first pedestrian M1 arrives at the destination point Po from the movement start point Ps are associated with the movement route Rw of the first pedestrian M1 and are acquired by the movement route acquiring element 32.

The movement route Rw of the first pedestrian M1 is acquired by the movement route acquiring element 32 when the second pedestrians M2 respectively move along first to seventh movement patterns respectively illustrated in FIGS. 7 to 13.

Figure 7:
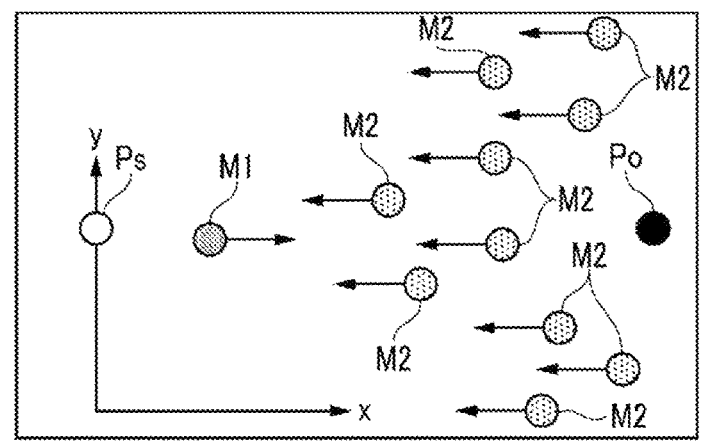
FIG. 7 is an explanatory view related to a first pattern of arrangement of second pedestrians.

As illustrated in FIG. 7, the first movement pattern is a pattern in which ten second pedestrians M2 move rearward or in a negative x direction from a side in front (position having a large x coordinate value) of the first pedestrian M1.

Figure 8:
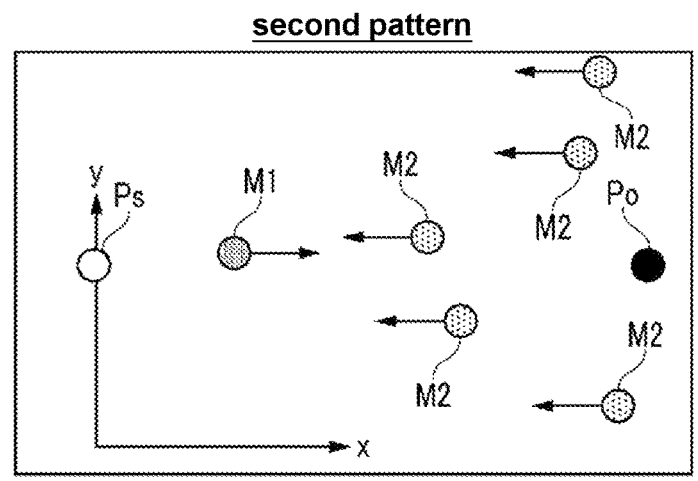
FIG. 8 is an explanatory view related to a second pattern of arrangement of the second pedestrians.

As illustrated in FIG. 8, the second movement pattern is a pattern in which five second pedestrians M2 move rearward or in the negative x direction from a side in front of the first pedestrian M1.

Figure 9:
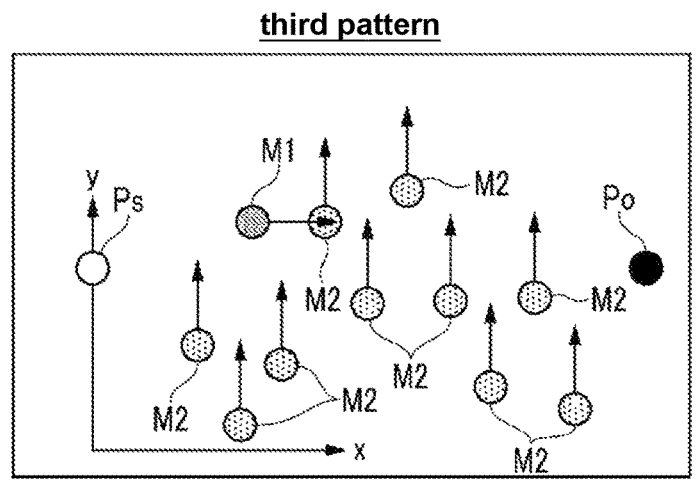
FIG. 9 is an explanatory view related to a third pattern of arrangement of the second pedestrians.

As illustrated in FIG. 9, the third movement pattern is a pattern in which ten second pedestrians M2 move in a direction to the left or in the positive y direction from the right side (position having a small y coordinate value) of the first pedestrian M1.

Figure 10:
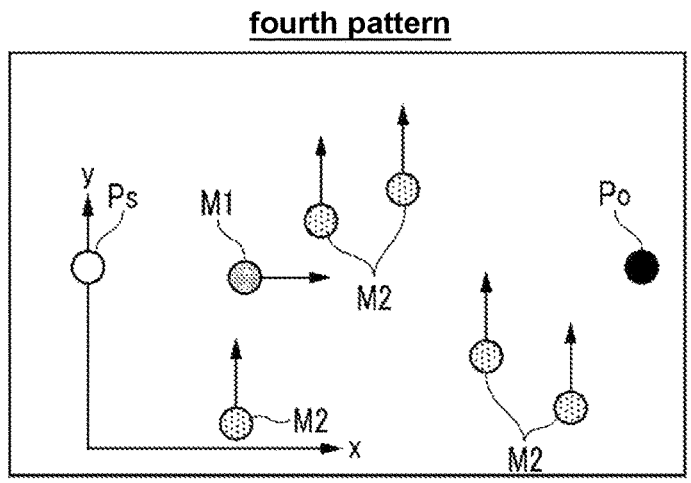
FIG. 10 is an explanatory view related to a fourth pattern of arrangement of the second pedestrians.

As illustrated in FIG. 10, the fourth movement pattern is a pattern in which five second pedestrians M2 move in the direction to the left or in the positive y direction from the right side of the first pedestrian M1.

Figure 11:
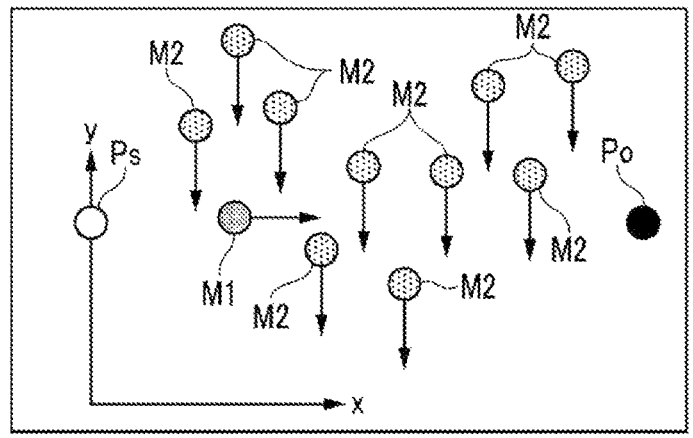
FIG. 11 is an explanatory view related to a fifth pattern of arrangement of the second pedestrians.

As illustrated in FIG. 11, the fifth movement pattern is a pattern in which ten second pedestrians M2 move in a direction to the right or in a negative y direction from the left side (position having a large y coordinate value) of the first pedestrian M1.

Figure 12:
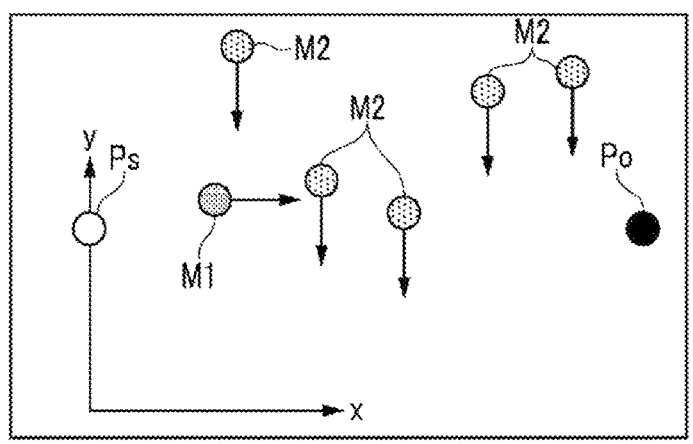
FIG. 12 is an explanatory view related to a sixth pattern of arrangement of the second pedestrians.

As illustrated in FIG. 12, the sixth movement pattern is a pattern in which five second pedestrians M2 move in the direction to the right or in the negative y direction from the left side of the first pedestrian M1.

Figure 13:
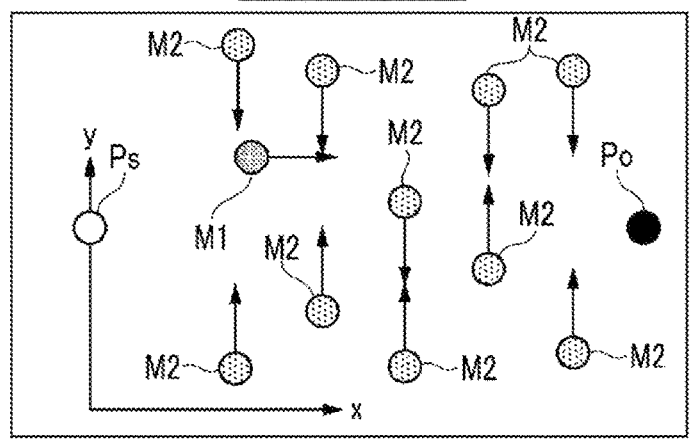
FIG. 13 is an explanatory view related to a seventh pattern of arrangement of the second pedestrians.

As illustrated in FIG. 13, the seventh movement pattern is a pattern in which five second pedestrians M2 move in the direction to the left (or in the positive y direction) from the right side of the first pedestrian M1, whereas the remaining five second pedestrians M2 move in the direction to the right (or in the negative y direction) from the left side of the first pedestrian M1.

The movement route acquiring element 32 acquires the movement route Rw of the first pedestrian M1 in a state of being associated with the positions of the second pedestrians M2, and acquisition results thereof are output to the learning data acquiring element 33.

The learning data acquiring element 33 acquires or generates learning data in accordance with a technique (which will be described below) based on the movement route Rw and the acquisition results of the positions of the second pedestrians M2 associated therewith. First, in a simulation environment realized by a Gazebo simulator or the like, virtual second pedestrians M2' (refer to FIG. 14) corresponding to the second pedestrians M2 described above and a virtual robot (not illustrated) corresponding to the robot 2 are generated or actualized.

Subsequently, while the virtual robot is moved in the virtual space along a movement route corresponding to the movement route Rw of the first pedestrian M1, the virtual second pedestrians M2' are moved in the virtual space along virtual spatial position tracks corresponding to the actual spatial position tracks of the second pedestrians M2 acquired by the movement route acquiring element 32.

While the virtual robot is moving, a plurality of images indicating a visual environment around (for example, in front of) the virtual robot is generated in a predetermined cycle. It is desirable that the generated images coincide with the position, the posture, the angle of view, and the sampling cycle of the input device mounted in the real robot. Mask images are sequentially generated as "environmental images" by a single shot multibox detector (SSD) technique based on the plurality of images.

Figure 14:
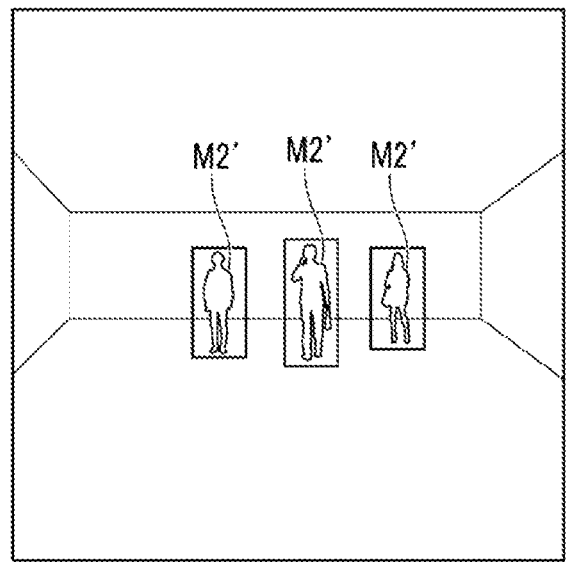
FIG. 14 is an explanatory view related to an image from a viewpoint of a virtual robot in a simulation environment.
Figure 15:
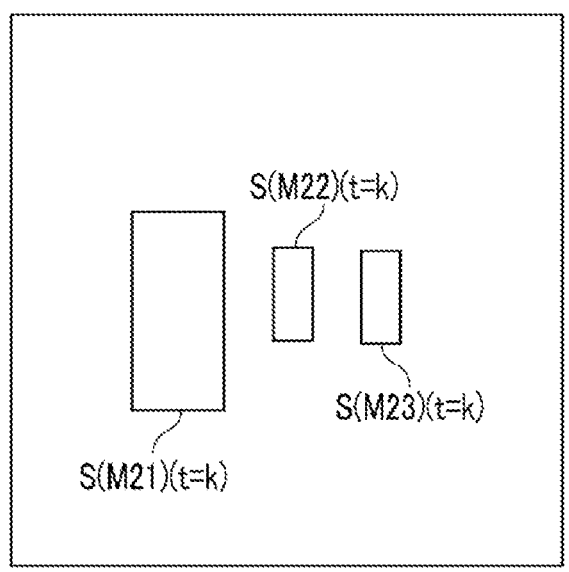
FIG. 15 is an explanatory view related to a mask image as an environmental image generated from the image of FIG. 14.

For example, as illustrated in FIG. 14, when three virtual second pedestrians M21', M22', and M23' are positioned in front of the virtual robot in a simulation environment, three rectangular moving object image regions in an image coordinate system respectively corresponding to the three virtual second pedestrians M21', M22', and M23' are searched in accordance with the SSD technique, and therefore the environmental image illustrated in FIG. 15 is generated. The shapes of the moving object image regions may be circular shapes, oval shapes, triangular shapes, trapezoidal shapes, polygonal shape, or shapes of combinations thereof, in addition to rectangular shapes.

As illustrated in FIG. 15, in the environmental image, respective occupation image regions (moving object image regions) of the three virtual second pedestrians M21', M22', and M23' are displayed as three rectangular moving object image regions S(M21), S(M22) and S(M23).

The environmental images are sequentially acquired in a sampling cycle and are cumulatively stored in the storage device. Further, the environmental images acquired through a plurality of preceding times including a current time are compounded, so that a compound environmental image (compound mask image) and environmental image data indicating the compound environmental image are generated. For example, time-series environmental images acquired through three times in total including preceding times and the current time, that is, environmental images respectively acquired at a current time t=k ("k" is an index indicating the sampling cycle), a preceding time t=k−1, and a time before the preceding time t=k−2 are superposed, so that the compound environmental image as illustrated in FIG. 16 is generated.

Figure 16:
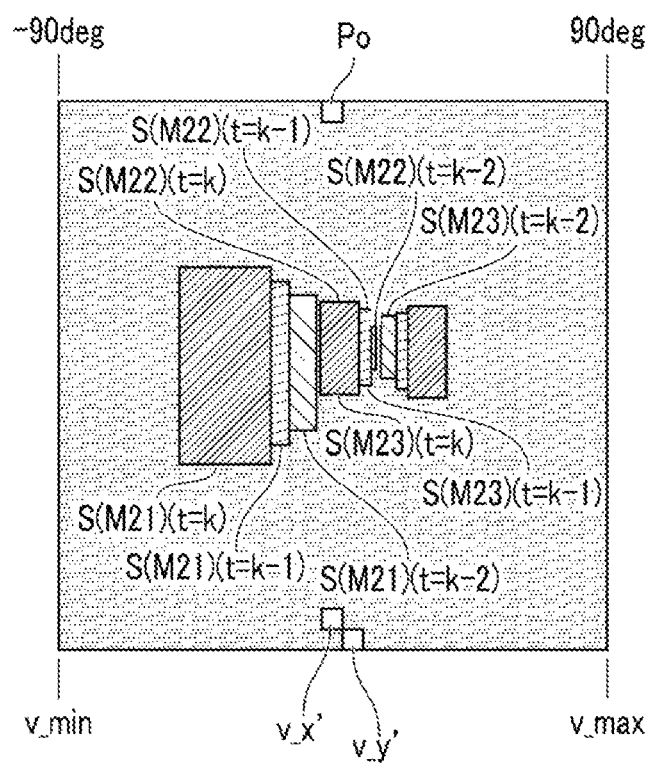
FIG. 16 is an explanatory view related to a compound environmental image.

The compound environmental image illustrated in FIG. 16 includes moving object image regions S(M2$i$) (t=k−2), S(M2$i$) (t=k−1), and S(M2$i$) (t=k) acquired through three times including preceding times and the current time corresponding to virtual second pedestrians M2$i'$ (i=1, 2, and 3). In the present embodiment, regarding the same virtual second pedestrians M2$i'$, environmental images are sequentially superposed in time series, such that a rectangular region in a current environmental image is superposed on a rectangular region in a preceding environmental image. Therefore, in FIG. 16, a portion of the moving object image region S(M2$i$) (t=k−2) acquired at the time before the preceding time is concealed by the shadow of the preceding moving object image region S(M2$i$) (t=k−1), and a portion of the preceding moving object image region S(M2$i$) (t=k−1) is concealed by the shadow of the current moving object image region S(M2$i$) (t=k).

In the compound environmental image illustrated in FIG. 16, an overall brightness of the moving object image regions S(M2$i$) becomes lower as they become older. The environmental image data may be generated such that at least one of a chroma and a hue changes in time series in place of or in addition to the brightness of the moving object image regions S(M2$i$). The environmental image data may be generated such that at least one of the hue, the chroma, and the brightness of only a portion such as a boundary portion changes in time series instead of the moving object image regions S(M2$i$) in their entirety.

In an upper end part of the compound environmental image, the current destination point Po (t=k) is expressed as a position of an image region (or pixels) indicating a figure such as a rectangular white box having a predetermined shape and a predetermined color, and the image region in the compound environmental image. The position of the destination point Po is defined by a pixel position in the compound environmental image in a lateral direction indicating a value of an azimuthal angle range of −90 deg to 90 deg having an azimuth corresponding to the center in front when referring to the self-position of the virtual robot at the current time as a reference azimuthal angle (=0 deg). The position of the destination point Po may be defined by the pixel position in the compound environmental image in the vertical direction or the image coordinate values.

Moreover, at a lower end of the compound environmental image, a current virtual x velocity component v_x' (t=k) and a virtual y velocity component v_y' (t=k) of the virtual robot are expressed as positions of image regions (or the pixels) indicating figures such as two rectangular white boxes having predetermined shapes and predetermined colors, and the image region in the compound environmental image. The virtual x velocity component v_x' is an x component of the velocity of the virtual robot in the virtual space and is defined by the pixel position in the compound environmental image in the lateral direction indicating a value within a range of a minimum movement velocity v_min (for example, zero) to a maximum movement velocity v_max of the virtual robot. Similarly, the virtual y velocity component v_y' is a y component of the velocity of the virtual robot in the virtual space and is defined by the pixel position in the compound environmental image in the lateral direction indicating a value within a range of the minimum movement velocity v_min (for example, zero) to the maximum movement velocity v_max of the virtual robot. At least one of the virtual x velocity component v_x' and the virtual y velocity component v_y' may be defined by the pixel position in the compound environmental image in the vertical direction or the image coordinate values.

In the learning data acquiring element 33, a moving direction command of the virtual robot at the time of sampling is set as a vector having three directions such as "a direction to the left", "a central direction (forward direction)", and "a direction to the right" as elements. For example, when the moving direction command is a command of moving the virtual robot forward, an element corresponding to "the central direction" is set to "1", and elements respectively corresponding to "the direction to the left" and "the direction to the right" are set to "0".

When the moving direction command is a command of moving the virtual robot in the direction to the right (direction to the right side with respect to the forward direction at an azimuthal angle of a first predetermined azimuthal angle $\theta_1$ or larger), an element corresponding to "the direction to the right" is set to "1", and elements respectively corresponding to directions other than this are set to "0". Similarly, when the moving direction command is a command of moving the virtual robot in the direction to the left (direction to the left side with respect to the forward direction at an azimuthal angle of a second predetermined azimuthal angle $\theta_2$), an element corresponding to "the direction to the left" is set to "1", and elements respectively corresponding to directions other than this are set to "0". The first predetermined azimuthal angle $\theta_1$ and the second predetermined azimuthal angle $\theta_2$ may be the same as each other or may be different from each other.

Subsequently, the learning data acquiring element 33 generates data of one set of a compound environmental image (refer to FIG. 16) and a moving direction command associated therewith as learning data in a predetermined cycle. Further, when a predetermined number of (for example, several thousands or more) pieces of learning data are generated, the learning data is output to the CNN learning element 34. The learning data acquiring element 33 may output learning data to the CNN learning element 34 every time one piece or a plurality of pieces of learning data are generated in a predetermined cycle or in a plurality of predetermined cycles.

The CNN learning element 34 executes learning of the model parameters of the CNN using the input learning data. Specifically, an environmental image in the learning data of one set is input to the CNN, and a moving direction command is used as teacher data with respect to an output of the CNN corresponding to the input.

An output layer of the CNN is constituted of three units. A command having three softmax values from the three respective units as elements (which will hereinafter be referred to as "a CNN output command") is output from the CNN. The CNN output command is constituted of a command having the same three directions ("the direction to the left", "the central direction", and "the direction to the right") as those of the moving direction command as elements.

Subsequently, using a loss function (for example, a mean sum of squares error) of the moving direction command and the CNN output command, the weight of the bonding layer of the CNN and the bias term are determined in accordance with a gradient method. That is, learning computation of the model parameters of the CNN is executed. Further, when the learning computation is executed over the number of sets (that is, several thousand times) of the learning data, learning computation of the model parameters of the CNN in the CNN learning element 34 ends. In the learning apparatus 30, as described above, learning of the model parameters of the CNN is executed.

Next, with reference to FIG. 17, a constitution of the route determination system 1 and the like of the present embodiment will be described. The route determination system 1 determines (calculates) a moving velocity command v_cmd as the route of the robot 2 using a technique which will be described below. The moving velocity command v_cmd has a target x velocity component v_x_cmd and a target y velocity component v_y_cmd which are target values for the x velocity component v_x and the y velocity component v_y of the robot 2 as elements.

Figure 17:
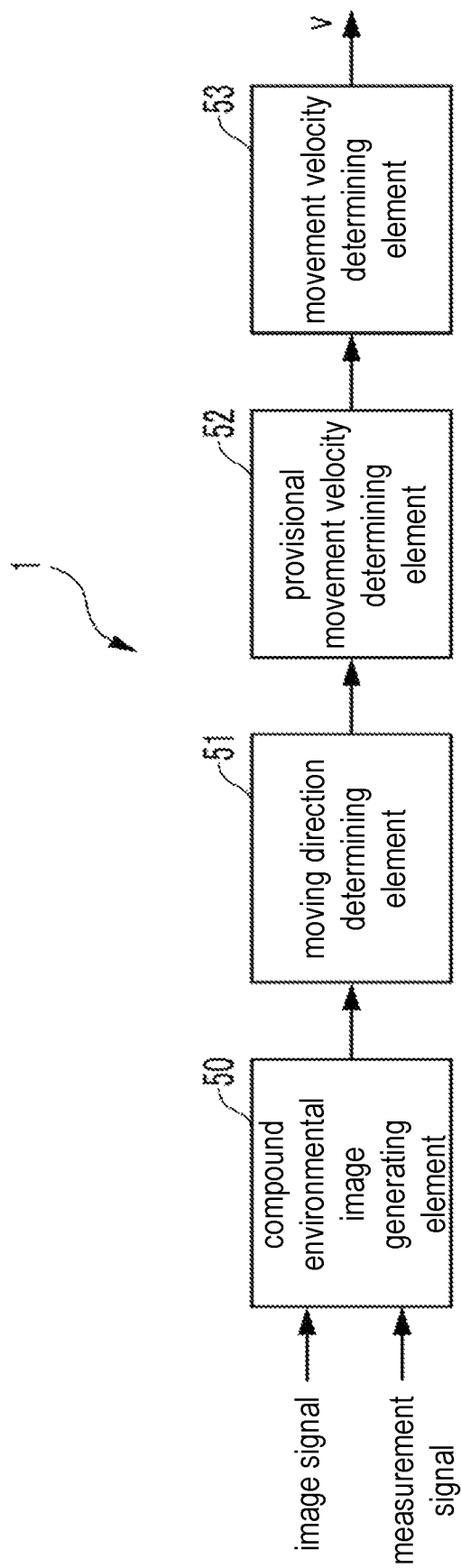
FIG. 17 is a block diagram indicating a constitution of the route determination system.

As illustrated in FIG. 17, the route determination system 1 includes a compound environmental image generating element 50, a moving direction determining element 51, a provisional movement velocity determining element 52, and a movement velocity determining element 53. Specifically, these elements 50 to 53 are constituted by the control device 10. Various kinds of control processing (which will be described below) are executed in a predetermined control cycle ΔT.

As image signals from the camera 11 and measurement signals from the LIDAR 12 are input by the compound environmental image generating element 50, a compound environmental image is generated in accordance with the SSD technique described above. Similar to the compound environmental image illustrated in FIG. 16, the time series of rectangular regions indicating moving objects in front is displayed in the compound environmental image, and the x velocity component v_x, the y velocity component v_y, and the designation point Pobj (not illustrated) of the robot 2 are displayed, in place of the virtual x velocity component v_x', the virtual y velocity component v_y', and the destination point Po.

Positions and sizes of traffic participants are determined based on image signals of the camera 11 and measurement signals of the LIDAR 12. In addition, the x velocity component v_x and the y velocity component v_y of the robot 2 are determined based on measurement signals of the LIDAR 12 and detection signals of the acceleration sensors 13. Moreover, the designation point Pobj is determined depending on a destination point signal from the server 5. An environmental image generated as described above is output to the moving direction determining element 51 from the environmental image generating element 50.

The moving direction determining element 51 includes a CNN (learned model) in which the model parameters are learned by the CNN learning element 34 described above, and the moving direction of the robot 2 is determined as follows using the CNN.

First, in the moving direction determining element 51, when an environmental image from the environmental image generating element 50 is input to the CNN, the CNN output command described above is output from the CNN. Subsequently, in three elements ("the direction to the left", "the central direction", and "the direction to the right") of the CNN output command, a direction of an element having the largest value is determined as the moving direction of the robot 2. Further, the moving direction of the robot 2 determined as described above is output to the provisional movement velocity determining element 52 from the moving direction determining element 51.

In the provisional movement velocity determining element 52, a provisional moving velocity command v_cmd_cnn is calculated based on the moving direction of the robot 2 from the moving direction determining element 51 and the x velocity component v_x and the y velocity component v_y of the robot 2. The provisional moving velocity command v_cmd_cnn is a vector having a provisional value v_x_cnn of an x velocity component and a provisional value v_y_cnn of a y velocity component of the robot 2 as elements. Subsequently, the provisional moving velocity command v_cmd_cnn of the robot 2 determined as described above is output to the movement velocity determining element 53 from the provisional movement velocity determining element 52.

In the movement velocity determining element 53, the moving velocity command v_cmd is determined based on the provisional moving velocity command v_cmd_cnn in accordance with an algorithm in which a dynamic window approach (DWA) is applied. The moving velocity command v_cmd has the target x velocity component v_x_cmd and the target y velocity component v_y_cmd as elements, the two velocity components v_x_cmd and v_y_cmd are used as target values for the x velocity component and the y velocity component of the robot 2 in movement control processing (which will be described below).

Specifically, an objective function G(v) is defined in accordance with Relational Expression (1), and the moving velocity command v_cmd is determined such that the objective function G(v) has the largest value.

$$G(v)=\alpha \cdot cnn(v)+\beta \cdot dist(v) \qquad (1)$$

Each of the factors "α" and "β" is a predetermined weight parameter and is determined based on operational characteristics of the robot 2. The factor "cnn(v)" has a deviation between a velocity command having the x velocity component and the y velocity component within the dynamic window as elements and the provisional moving velocity command v_cmd_cnn as a main variable, and is a dependent variable or a function indicating a larger value when the value of the main variable become smaller.

The factor "dist(v)" is a value indicating the distance to a traffic participant (moving object) closest to the robot 2 (moving apparatus) when the robot 2 is presumed to move with the provisional value v_x_cnn of the x velocity component and the provisional value v_y_cnn of the y velocity component, and is determined based on measurement signals of the LIDAR 12.

In the route determination system 1 of the present embodiment, as described above, the moving velocity command v_cmd having the target x velocity component v_x_cmd and the target y velocity component v_y_cmd as elements is determined. In the present embodiment, determining the moving velocity command v_cmd corresponds to determining the route of the robot.

Next, with reference to FIG. 18, movement control processing will be described. Movement control processing is performed to control two actuators 24 and 25 of the movement mechanism 21 such that the robot 2 moves with two target velocities v_x_cmd and v_y_cmd described above and is executed by the control device 10 in the predetermined control cycle ΔT.

Figure 18:
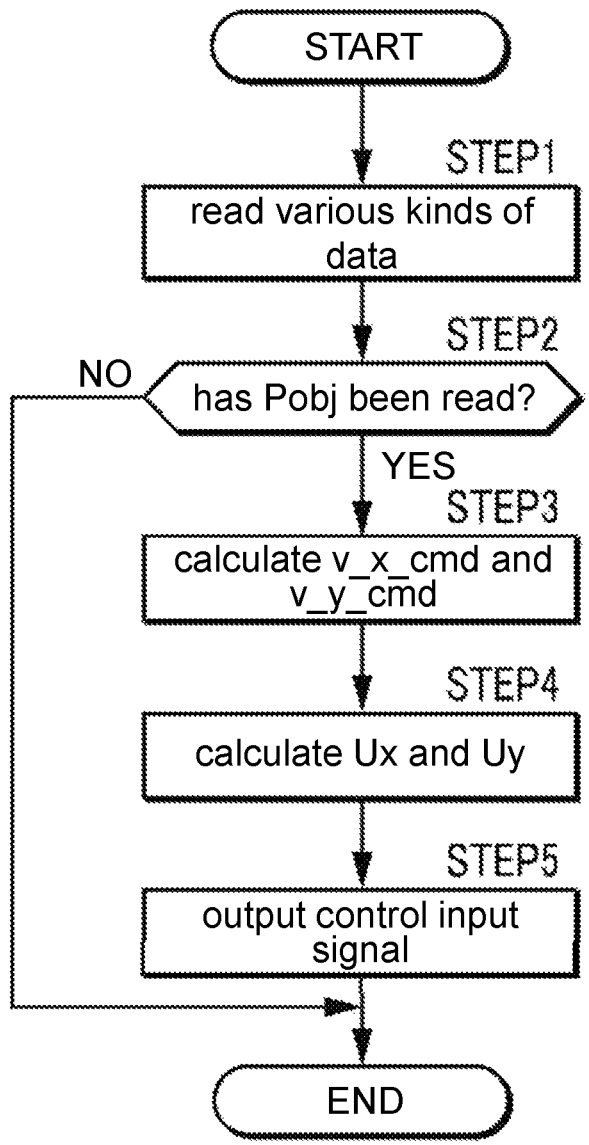
FIG. 18 is a flowchart showing movement control processing.

As illustrated in FIG. 18, first, various kinds of data are read (FIG. 18/STEP 1). Various kinds of data are pieces of data of signals respectively input to the control device 10 from the camera 11, the LIDAR 12, the acceleration sensors 13, and the radio communication device 14 described above.

Subsequently, it is judged whether or not the designation point Pobj indicated based on the designation point data has been read (FIG. 18/STEP 2). When the judgement result is negative (FIG. 18/STEP 2, NO), that is, when no designation point data is received from the server 5, this processing ends without any change.

On the other hand, when the judgement result is positive (FIG. 18/STEP 2, YES), the target x velocity component v_x_cmd and the target y velocity component v_y_cmd are calculated in accordance with the technique in FIG. 17 described above (FIG. 18/STEP 3).

Subsequently, according to the target x velocity component v_x_cmd and the target y velocity component v_y_cmd, an x control input component Ux and a y control input component Uy are calculated in accordance with a predetermined control algorithm (FIG. 18/STEP 4). In this case, as a predetermined control algorithm, a feedforward control algorithm such as map searching, or a feedback control algorithm may be used.

Next, a control input signal corresponding to the x control input component Ux is output to the first actuator 24, and a control input signal corresponding to the y control input component Uy is output to the second actuator 25 (FIG. 18/STEP 5). Thereafter, this processing ends. Accordingly, control is performed such that an actual x velocity component v_x and an actual y velocity component v_y of the robot 2 become the target x velocity component v_x_cmd and the target y velocity component v_y_cmd. As a result, the robot 2 moves toward the designation point Pobj along a route determined by these target velocities v_x_cmd and v_y_cmd, while steering clear of traffic participants in front.

Effects

According to the route determination system 1 as an embodiment of the disclosure, in an environment in which a plurality of second pedestrians M2 (second moving objects) moves along a plurality of respective movement patterns, a plurality of movement routes Rw when the first pedestrian M1 (first moving object) moves toward the destination point Po while avoiding interference with the plurality of second pedestrians M2 is recognized (refer to FIGS. 7 to 13).

Moreover, data, in which a compound environmental image (refer to FIG. 16) constituted of a time series of environmental images (refer to FIG. 15) indicating a visual environment around a virtual robot (virtual moving apparatus) and a moving direction command indicating a moving direction of the virtual robot when the virtual robot moves along each of the plurality of movement routes in a virtual space are combined, is generated as learning data.

A learned CNN is generated as a learned model by learning model parameters of a CNN (action model) in which environmental image data including the compound environmental image is input whereas the moving direction command is output, using the learning data. Further, the moving velocity command v_cmd for the robot 2 (moving apparatus) is determined using the learned CNN.

Therefore, the model parameters of the CNN (learning model) can be learned accurately while an actual movement route of the first pedestrian M1 (first moving object) and relative movement behaviors of the second pedestrians M2 with respect to the first pedestrian M1 are reflected. As a result, even in a condition in which a plurality of pedestrians (moving objects) is present around the robot 2, a target movement route of the robot 2 can be determined such that the robot 2 moves smoothly to the destination point while avoiding interference with the plurality of moving objects.

In addition, in the compound environmental image, two rectangular white boxes indicating the x velocity component v_x and the y velocity component v_y and a rectangular white box indicating the destination point Po are expressed, in addition to the environmental image of a side in front of the robot 2. Therefore, the structure of the CNN is simplified. Further, the computation processing quantity required when determining the target movement route of the robot 2 is reduced. Accordingly, the target movement route of the robot 2 can be determined promptly and accurately.

Moreover, the learning data is generated by moving the virtual robot along each of the plurality of movement routes Rw in the virtual space. Accordingly, since there is no need to prepare an environment in which the robot 2 (real machine) and traffic participants (plurality of moving objects) are present, it is possible to easily generate the learning data.

Other Embodiments of the Disclosure

In the foregoing embodiment, an autonomously movable robot 2 has been employed as "a moving apparatus". However, as another embodiment, a vehicle which moves by rotating one or a plurality of wheels, a crawler type moving apparatus, a biped walking robot, or the like may be employed as a moving apparatus. A moving apparatus 2 may be a moving apparatus which moves when being operated by a human on board the moving apparatus 2 or may be a moving apparatus which moves when being remote-controlled by a human.

In the foregoing embodiment, both a first moving object and a plurality of second moving objects are pedestrians. However, as another embodiment, a portion or all of the first moving object and the plurality of second moving objects may be moving objects other than pedestrians. For example, the objects may be moving apparatuses which are autonomously movable, moving apparatuses which are operated by an operator, bicycles, humans on wheelchairs, animals other than humans, such as dogs or cats.

As the virtual moving apparatus, a virtual moving apparatus corresponding to the kind of the first moving object may be defined instead of a virtual robot. Virtual moving objects corresponding to the kind of the second moving objects may be generated instead of pedestrians (virtual pedestrians) as at least a portion of a plurality of virtual moving objects.

In the foregoing embodiment, a CNN is employed as an action model. However, as another embodiment, other action models such as a recurrent neural network (RNN) or a deep Q-network (DQN), in which environmental image data is input whereas action parameters are output may be employed as an action model.

The foregoing embodiment has described an example in which a gradient method is used as a predetermined learning method. However, a predetermined learning method of the disclosure is not limited thereto as long as it learns the model parameters of an action model.

In the foregoing embodiment, the movement mechanism 21 including the core body 22 and the plurality of rollers 23 is employed as a movement mechanism of the robot 2. However, as another embodiment, a movement mechanism having a different constitution in which the robot 2 can be moved in all directions may be employed. For example, as the movement mechanism, a movement mechanism having a constitution in which a sphere and a plurality of rollers are combined and the sphere is rotatably driven by the plurality of rollers such that the robot 2 is moved in all directions may be employed.

In the foregoing embodiment, software for executing computation processing according to the CNN is stored and retained in a storage device constituting the control device 10 of the robot 2. However, as another embodiment, the software may be stored in a storage device constituting the server 5, computation processing for determining a target movement route may be executed by the server 5, and the target movement route as a result of the computation processing may be transmitted from the server 5 to the robot 2.

Moreover, the embodiment has described an example in which the moving velocity command v_cmd having the x velocity component v_x and the y velocity component v_y as elements is calculated as the moving velocity of the robot 2 by the movement velocity determining element 53 using the DWA technique. However, in place thereof, the x velocity component v_x and an angular velocity co may be calculated as the moving velocity of the robot 2 by the movement velocity determining element 53 in accordance with the DWA technique.

In the foregoing embodiment, the movement route acquiring element 32 acquires the movement route Rw of the first pedestrian M1 when a plurality of second pedestrians M2 moves along the first to seventh movement patterns as movement patterns of the second pedestrians M2 (refer to FIGS. 7 to 13). As another embodiment, additionally or alternatively, the movement route Rw of the first pedestrian M1 when the second pedestrians M2 move along movement patterns of which the moving direction and the number of the second pedestrians M2 are different from those of the seven movement patterns may be acquired.

For example, a movement pattern in which a plurality of second pedestrians M2 constituting a first group and a plurality of second pedestrians M2 constituting a second group move such that they obliquely intersect each other, a movement pattern in which a plurality of second pedestrians M2 constituting the first group moves in an x direction and a plurality of second pedestrians M2 constituting the second group moves in a y direction such that they intersect each other, or the like may be used.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A route determination method that is a method for determining a target movement route of a moving apparatus to a destination point in a condition in which a plurality of moving objects is present around the moving apparatus, the route determination method comprising:
generating a condition in which a virtual robot moves from a movement start point to the destination point and a plurality of virtual second pedestrians simultaneously move along a plurality of respective movement patterns different from each other, and recognizing a plurality of movement routes of the virtual robot moving to the destination point in the condition, wherein the virtual robot avoids interference with each of the plurality of virtual second pedestrians while moving;
measuring an actual spatial position track of a plurality of second pedestrians when a first pedestrian moves from the movement start point to the destination point, and acquiring a plurality of pieces of learning data by moving the virtual second pedestrian in a virtual space according to the actual spatial position track of the plurality of second pedestrians while moving the virtual robot in the virtual space, wherein the plurality of pieces of learning data are constituted of environmental image data around the virtual robot moving along each of the plurality of movement routes in the virtual space and the action parameters indicating actions of the virtual robot associated with the environmental image data and the environmental image data includes a compound environmental image generated by compounding a time series of environmental images indicating an environment of the virtual robot moving along each of the plurality of movement routes in the virtual space;
generating a learned model in which the environmental image data is input wherein the action parameters are output by learning model parameters in accordance with a designation learning method using the plurality of pieces of learning data;
determining the target movement route of the moving apparatus using the learned model; and
controlling the moving apparatus to move along the determined target movement route.

2. The route determination method according to claim 1, wherein a plurality of images including a plurality of moving object image regions indicating a plurality of respective moving objects present around the virtual robot are recognized as the environmental images, and
wherein compounding the time series of environmental images comprises superposing the plurality of moving object image regions included in a plurality of the respective environmental images.

3. The route determination method according to claim 2, wherein compounding the time series of environmental images comprises superposing the plurality of moving object image regions such that a hue, a chroma, a brightness, or an arbitrary combination thereof in a portion or all of each of the plurality of moving object image regions is distinguished in accordance with a sequential order of the time series of the plurality of environmental images respectively.

4. The route determination method according to claim 2, wherein compounding the time series of environmental images comprises superposing a subsequent moving object image region of the plurality of moving object image regions in time series on a preceding moving object image region of the plurality of moving object image regions in time series such that at least a portion thereof is concealed.

5. The route determination method according to claim 1, wherein the environmental image data further includes at least one of a velocity image indicating fluctuations in velocity of the virtual robot and a directional image indicating a direction of the destination point, in addition to the compound environmental image.

6. The route determination method according to claim 1, wherein in generating the condition, the virtual robot and the plurality of virtual second pedestrians move simultaneously when the virtual robot moves from the movement start point to the destination point.

7. The route determination method according to claim 1, further comprising:
measuring an actual spatial position track of the first pedestrian moving from the movement start point to the destination point, and acquiring the plurality of pieces of learning data by moving the virtual robot in the virtual space according to the actual spatial position track of the first pedestrian.

8. The route determination method according to claim 1, wherein the action parameters comprise a moving direction command.

9. The route determination method according to claim 1, wherein a movement speed command is determined as the target movement route of the moving apparatus.

10. The route determination method according to claim 9, wherein the movement speed command comprises a target x velocity component and a target y velocity component as elements.

* * * * *